United States Patent [19]

Appiano et al.

[11] 4,347,608

[45] Aug. 31, 1982

[54] SELF-CHECKING SYSTEM FOR ELECTRONIC PROCESSING EQUIPMENT

[75] Inventors: Silvano Appiano, Montafia-Asti; Duccio Di Pino, Pino Torinese-Torina; Cesare Poggio, Turin, all of Italy

[73] Assignee: CSELT Centro Studi e Laboratori Telecomunicazioni S.p.A., Turin, Italy

[21] Appl. No.: 114,294

[22] Filed: Jan. 22, 1980

[30] Foreign Application Priority Data

Jan. 24, 1979 [IT] Italy .............................. 67150 A/79

[51] Int. Cl.³ .............................................. G06F 11/00
[52] U.S. Cl. .................................... 371/16; 364/200; 371/25
[58] Field of Search .................. 371/16, 25, 53, 68; 364/200, 900

[56] References Cited

U.S. PATENT DOCUMENTS

| | | | |
|---|---|---|---|
| 3,749,897 | 7/1973 | Hirvela | 371/16 |
| 3,838,264 | 9/1974 | Maker | 371/25 |
| 4,092,732 | 5/1978 | Ouchi | 371/53 |
| 4,108,359 | 8/1978 | Proto | 371/53 |
| 4,118,789 | 10/1978 | Casto et al. | 371/68 |
| 4,142,243 | 2/1979 | Bishop et al. | 371/53 |
| 4,251,885 | 2/1981 | Dodt et al. | 371/16 |

*Primary Examiner*—Charles E. Atkinson
*Attorney, Agent, or Firm*—Karl F. Ross

[57] ABSTRACT

A central processor controlling a set of peripheral units through an associated logic network is programmed to activate from time to time, through a direct connection by-passing the logic network, a checking unit including a read-only memory storing a variety of microprograms in areas individually addressable by the processor. Upon the reception of a memory address, a timing circuit is set to determine the frequency of stepping pulses advancing a counter which calls forth successive phases of the selected mircroprogram. Code words read out during these phases to the logic network are fed back by the latter to the processor for comparison with corresponding contents of its own program memory; in the event of a disparity, or when failure of the processor to emit a resetting signal lets the counter advance to the limit of its capacity, an alarm indicator is tripped.

8 Claims, 1 Drawing Figure

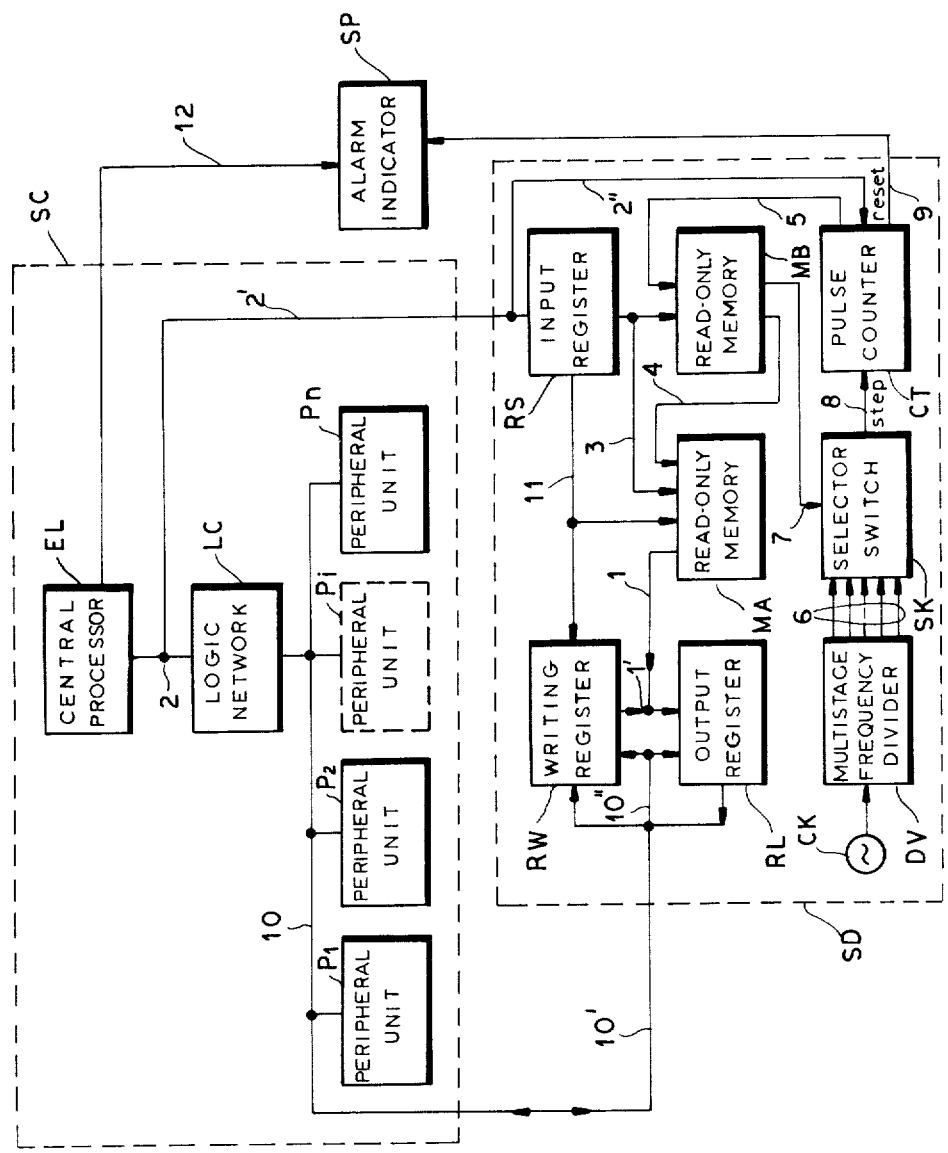

SELF-CHECKING SYSTEM FOR ELECTRONIC PROCESSING EQUIPMENT

FIELD OF THE INVENTION

Our present invention relates to a self-checking system for electronic processing equipment of the type wherein a central processor is programmed to exchange information with a plurality of peripheral units.

BACKGROUND OF THE INVENTION

Processing equipment of this nature is widely used for a variety of operations including the control of machine tools in industrial plants or the establishment and termination of connections in telecommunication exchanges, for example. In all these instances it is important to detect and localize any possible malfunctions in real time so that a defective component can be quickly replaced by a spare. As a rule, the units used for checking on the proper performance of the operating equipment must work with a higher degree of reliability than the equipment itself in order to prevent, on the one hand, the emission of erroneous alarm indications and, on the other hand, the nonrecognition of defects. At the same time, these checking units must not unduly encumber the processing system and must not interfere with the normal operation of the equipment supervised thereby.

Conventional self-checking system for processing equipment of the type here envisaged are relatively complex and occupy large portions of the program memories associated with such equipment. These systems are therefore not well suited for the supervision of smaller components such as microprocessors utilizing memories of limited capacity.

OBJECTS OF THE INVENTION

An important object of our present invention, therefore, is to provide improved means for efficiently checking the performance of a central processor, dialoguing with several peripheral units, without significantly encumbering the processor itself.

A related object is to provide means for checking the operation not only of the processor but also of a logic network interfacing that processor with the associated peripheral units.

SUMMARY OF THE INVENTION

In accordance with our present invention, we provide a checking unit which is addressable by the processor supervised thereby and comprises memory means—advantageously two read-only memories—storing a plurality of microprograms each involving the emission of code words in a succession of program phases, timing means responsive to the reception of a memory address from the processor for reading out, at a predetermined rate, stored code words pertaining to the successive phases of a microprogram identified by that address, and alarm means triggerable by the processor to indicate a malfunction upon detection of a disparity between the code words read out and corresponding words simultaneously generated in the processor as part of its disgnostic program. Normally, of course, the words so generated in a checking operation are identical with those stored in the memory means at the address emitted by the processor.

When the processor communicates with the associated peripheral units by way of a central logic network or preprocessor performing ancillary operations such as pulse counts or bit comparisons, we prefer to connect the checking unit with the processor via a signal path which bypasses that logic network and enables the direct transmission of a memory address to the checking unit for the initiation of a microprogram stored therein. The code words read out in successive phases of that microprogram, however, are fed back to the processor through the central logic network. The latter may recurrently sample an output register of the checking unit, temporarily storing the code word last read out from its memory means, in the same manner as the associated peripheral units are conventionally sampled under the control of the processor in the execution of its program; a code word read in the output register of the checking unit is then forwarded to the processor, for comparison with corresponding contents of the processor's program memory, only if that code word differs from the one read in the preceding sampling cycle. Thus, the checking unit may be regarded as an additional peripheral unit dialoguing with the processor by way of the central logic network.

Besides the aforementioned output register, and an input register temporarily storing the memory address last received from the processor, the checking unit may comprise a further register loadable by the central logic network with a test word which is then transferred to the output register for retransmission to the processor and comparison with the original test word. This procedure enables verification of the proper operation of the logic network itself.

In accordance with another feature of our invention, the rate of readout of successive code words from the memory means of the checking unit may be varied for different microprograms stored therein. For this purpose the timing means of the checking unit may comprise a source of stepping pulses of variable cadence, adjusted with the aid of selector means responsive to the received memory address, and a pluse counter advanced by the stepping pulses at the selected rate. This pulse counter, advantageously, is resettable by a signal from the processor at the end of a chosen microprogram (which may coincide with the start of another microprogram identified by a new memory address) and is provided with an output connection to the alarm means for triggering same if the resetting signal does not arrive in time, i.e. if the counter is permitted to reach its full count slightly exceeding the number of phases of the longest microprogram stored in the checking unit.

BRIEF DESCRIPTION OF THE DRAWING

The above and other features of our invention will now be described in detail with reference to the drawing the sole FIGURE of which is a block diagram of an embodiment of our improved self-checking system.

SPECIFIC DESCRIPTION

In the drawing we have shown at SC an assembly of conventional components including a central processor EL connected via a two-way line 2 to a logic network LC which in turn communicates by way of a bidirectional bus 10 with a multiplicity of peripheral units $P_1$, $P_2$, ... $P_i$, ... $P_n$.

A checking unit SD has an input register RS connected via a branch 2' of line 2 to the output of processor EL for receiving therefrom, at certain times in the evolution of a diagnostic program of that processor, an instruction word addressing one of several areas in each of two read-only memories MA and MB allocated to respective microprograms. Memory MA has a lead 1 extending to an output register RL whose contents can be read out into an extension 10′ of bus 10. A writing register RW has a loading input connected to bus extension 10′ and further has an output lead 1′ merging with lead 1 for transferring its contents to register RL. A lead 10″ forming part of bus extension 10′ terminates at respective control inputs of registers RL and RW for alternatively blocking same as more fully described hereinafter. Register RS has an output connection 3 extending to address inputs of memories MA and MB and is provided with an output lead 11 for alternatively blocking register RW and memory MA.

A crystal-controlled oscillator CK generates a high-frequency train of clock pulses whose recurrence rate or cadence is stepped down by a multistage frequency divider DV. The several stages of divider DV have individual output leads, collectively designated 6, extending to a selector switch SK designed to connect one of these stage outputs to a stepping input 8 of a binary pulse counter CT. The setting of selector switch SK is controlled by an output connection 7 from memory MB which carries a code associated with the microprogram that is identified by the address stored in input register RS. That address, communicated directly to memories MA and MB via line 3, is supplemented by combinations of less significant bits transmitted from memory MB to memory MA via a connection 4; the bit combination so transmitted is periodically incremented, at a rate dependent on the setting of switch SK, by the contents of pulse counter CT supplied to memory MB via a connection 5.

A resetting input of counter CT is connected to an extension 2″ of line branch 2′ which normally returns that counter to zero, under the control of processor EL, at the end of one microprogram coinciding with the start of another one. If, by reason of a malfunction, such resetting does not occur during the time available therefor, counter CT energizes a lead 9 to trigger an alarm indicator SP upon reaching its full count. Indicator SP, which may generate a visual alarm signal, is also triggerable directly by the processor EL via a lead 12 whenever that processor detects a disparity between a code word read out from register RL on bus extension 10′ and a corresponding word emitted at the same time by the nonillustrated program memory of the processor.

The operation of the described system is as follows:

A memory address delivered by processor EL on connection 2′ is temporarily stored in input register RS and communicated via line 3 to memories MA and MB. Memory MA is unblocked by a bit on lead 11 which also blocks the connection between writing register RW and lead 1. Memory MB, via connection 7, sets the selector switch SK in a position corresponding to the rate of evolution of the microprogram identified by the address stored in register RS. Counter CT, reset to zero via lead 2″ upon arrival of that memory address, now advances in response to the stepping pulses fed to its input 8 from frequency divider DV. With each step of counter CT, a new code word is read out to register RL via lead 1 from memory MA in response to the incrementation of the combined address received by that memory over connections 3 and 4.

Logic network LC periodically samples the checking unit SD via bus 10, 10′ and, by means of lead 10″, reads out the contents of register RL while blocking any writing in register RW. If the contents of register RL have changed since the last sampling, network LC transmits the word thus read out to a comparator in processor EL which determines whether that word agrees with the one appearing at the same time in the output of its program memory. If this is not the case, lead 12 is energized to trip the alarm indicator SP.

If processor EL detects no such disparity, the microprogram of unit SD continues until a new memory address appears on branch 2′, thereby resetting the counter CT and possibly readjusting the selector switch SK while initiating the emission of another series of code words from memory MA. If a malfunction in the processor unduly delays the resetting of counter CT, alarm indicator SP is tripped via lead 9.

At certain times in the program of processor EL, connection 2′ carries an address which does not identify any area allocated to a microprogram in memories MA and MB and which reverses the state of energization of lead 11 to unblock the output of register RW while blocking the memory MA. At the same time, a test word emitted by processor EL via network LC to bus bar 10 and its extension 10′ is loaded into register RW with concurrent transmission of a signal on lead 10″ blocking the readout of register RL while enabling writing in register RW. That test word is transferred from register RW to register RL from which it is fed back to network LC upon a subsequent change in the energization of lead 10″. Processor EL then compares the returned test word with the one just emitted and, upon detecting a disparity, again trips the alarm indicator via lead 12.

It will be apparent that processor EL may be a component of the microprocessor type and may be one of several such components forming part of a larger system. If a malfunction is signaled by the alarm indicator associated with any of these components, the latter and its preprocessor or interface unit LC are immediately replaced by a standby processor and logic network.

We claim:

1. In a system for the control of a plurality of peripheral units by a processor programmed to exchanged information with said peripheral units,
    the combination therewith of a checking unit addressable by said processor during execution of a diagnostic program, said checking unit comprising:
    memory means storing a plurality of microprograms each involving the emission of code words in a succession of phases;
    timing means responsive to reception of a memory address from said processor for reading out from said memory means to said processor, at a predetermined rate varying for different microprograms, code words pertaining to the successive phases of a microprogram identified by said memory address; and
    alarm means triggerable by said processor to indicate a malfunction upon detection of a disparity between code words read out from said memory means and corresponding words simultaneously generated in said processor as part of the latter's diagnostic program;
    said timing means including a source of stepping pulses of variable cadence, selector means connected to said source for adjusting said cadence under the control of a memory address received from said processor, and a pulse counter connected to said source for advancement by said stepping pulses.

2. The combination defined in claim 1 wherein said processor communicates with said peripheral units by way of a central logic network, said checking unit being addressable by said processor via a signal path bypassing said logic network but feeding back the read-out code words to the processor through said logic network.

3. The combination defined in claim 1 or 2 wherein said source comprises an oscillator and a multistage frequency divider driven by said oscillator, said selector means comprising a switching circuit for connecting a chosen stage output of said frequency divider to a stepping input of said counter.

4. The combination defined in claim 1 or 2 wherein said counter is resettable by a signal from said processor and has an output connection to said alarm means for triggering same upon reaching a full count in the absence of a resetting signal.

5. The combination defined in claim 1 or 2 wherein said memory means comprises two read-only memories addressable in parallel by said processor, one of said read-only memories controlling said selector means and supplying the other of said memories with a supplemental address incrementable by the reading of said counter.

6. In a system for the control of a plurality of peripheral units by a processor programmed to exchange information with said peripheral units through a central logic network, the combination therewith of a checking unit addressable by said processor during execution of a diagnostic program, said checking unit comprising:

memory means storing a plurality of microprograms each involving the emission of code words in a succession of phases;

timing means responsive to reception of a memory address from said processor via a signal path independent of said logic network for reading out from said memory means to said processor through said logic network, at a predetermined rate, code words pertaining to the successive phases of a microprogram identified by said memory address; and alarm means triggerable by said processor to indicate a malfunction upon detection of a disparity between code words read out from said memory means and corresponding words simultaneously generated in said processor as part of the latter's diagnostic program.

7. The combination defined in claim 2 or 6 wherein said checking unit further comprises an input register connected to said signal path for temporarily storing a memory address received from said processor and an output register for storing the code word last read out from said memory means, said output register being connected to said logic network for recurrent sampling thereby.

8. The combination defined in claim 7 wherein said checking unit additionally comprises a further register loadable by said logic network with a test word, said further register having an output connection to said output register for retransmitting said test word to said processor through said logic network.

* * * * *